(No Model.)
J. S. SPANGLER.
TOBACCO GRANULATING MACHINE.
No. 264,578. Patented Sept. 19, 1882.
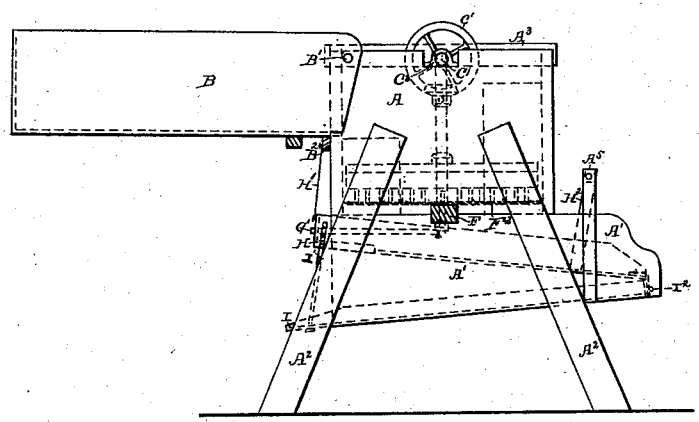
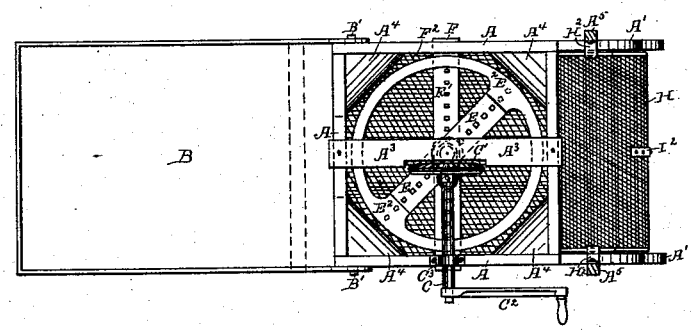
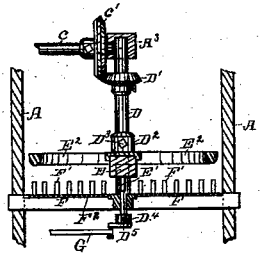
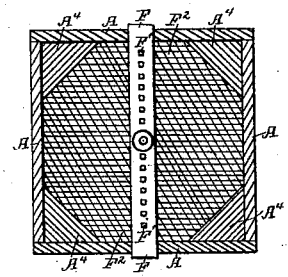
Witnesses:
Samuel T. P. Kinsey.
Frank P. Kinsey.
Inventor:
Jacob S. Spangler
pr Thomas P. Kinsey
Atty

UNITED STATES PATENT OFFICE.

JACOB S. SPANGLER, OF EPHRATA, PENNSYLVANIA.

TOBACCO-GRANULATING MACHINE.

SPECIFICATION forming part of Letters Patent No. 264,578, dated September 19, 1882.

Application filed May 22, 1882. (No model.)

*To all whom it may concern:*

Be it known that I, JACOB S. SPANGLER, of Ephrata, county of Lancaster, State of Pennsylvania, have invented a new and useful Improvement in Tobacco Breaking, Scrapping, or Granulating Machines, of which the following is a specification.

The object of the improvement is to furnish a machine that will operate without clogging, easily adjusted to operate upon a large or small quantity of tobacco, and free from all complication.

Referring to the drawings herewith, which form part of this specification, and in which corresponding letters designate corresponding parts, Figure 1 represents a general elevation of the machine, with the screen shown in dotted lines; Fig. 2, a plan of the same; Fig. 3, a detached view of the breaker-shaft, breaker, fly, and bed; Fig. 4, a plan of the bottom, showing wire screen and breaker-bed or concave.

A represents the receiving-box; A', projected support for the sieves; $A^2$, the legs; $A^3$, a cross for support of shafts; $A^4$, corner-pieces; $A^5$, standards for sieve-suspenders; B, the hopper or chute; B', the point of suspension; $B^2$, ledge under chute; C, horizontal shaft; C', bevel-gear; $C^2$, crank; $C^3$, bearing; D, vertical shaft; D', bevel-pinion; $D^2$, breaker-arm seat; $D^3$, set-screw for same; $D^4$, shaker to the screens; $D^5$, set-screw for same; E, revolving breaker; E', square teeth for same; $E^2$, fly-wheel for breaker; F, fixed bed breaker or concave; F', square teeth for same; $F^2$, coarse sieve-bottom; G, a wooden connecting-rod from the shaker $D^4$ to the sieve; H, the sieve, suspended centrally at the rear by a wire, H', and at the front, on opposite sides, by suspenders $H^2$, to the standards $A^5$, and oscillated by the pitman-rod G, attached to the sieve-back at G', and driven by the crank or shaker $D^4$. I is a sieve of finer mesh than H, suspended below and reversely inclined, centrally pivoted to H at $I^2$, and suspended from H at I'.

The constructive details are as follows: The box A, for ordinary use, is about twenty inches square and twenty-two inches deep, having a breaker-bed and coarse sieve-bottom at the depth of sixteen inches from the top. The corners of the box are filled out to form an octagonal opening and a more effective operating machine. A vertical shaft of one inch round iron has at its upper end a bevel-pinion of fourteen cogs, one-half inch pitch and one-half inch face, and at the lower end is reduced in size to pass through the breaker-bed and receive a shaker cam or crank for the sieve. Between the points named a shoe, $D^2$, slides freely upon the shaft, and is retained at any desired height by a set-screw, $D^3$. To this shoe is secured the breaker-arm E, of about two and one-quarter inches square, in length just clearing the sides of the box. Resting upon the opposite ends of the arm, and secured thereto, is a cast-iron fly-wheel rim, to give steadiness to the motion and ease to the operator. The arm E has inserted in its lower face a series of wrought-iron or steel pins or teeth of three-eighths inch square section, projecting one and one-fourth inch beyond the face, placed in a continuous line each side of the shaft (which passes through the arm) and set at one inch from center to center, the facets of the teeth at right angles and parallel with the arm. The bed is about two and one-half by one and one-half inches, is carried transversely through the box A, central thereto, and about sixteen inches below the top, and is supplemented by a screen-bottom of such mesh as is required for the purpose of limiting the size of the particles to be passed out of the machine. This bed is also provided with a series of teeth three-eighths inch square section, the facets of the same being at right angles and parallel with the bed-piece, the pitch or distance from center to center of the teeth corresponding with, but placed intermediate to, those of the revolving arm, so that the teeth of the arm in their revolution shall pass between those of the bed.

Below the bed or wire bottom is suspended the vibratory screen or sieve H, which is about two feet six inches long, and exposes about two feet of screen, while I is a still finer sieve, suspended reverse to and beneath the sieve H by a single clip, $I^2$, at the front and two suspenders, I', at the rear.

The hopper B is pivoted at B', and when the machine is not in service is thrown back over the same, thus occupying very little room. The box A is provided with an opening, on the side next to the hopper, of five by twelve inches, covered by a flexible flap, which, adjusting itself to the material fed to the machine, prevents in a great measure the exit of dust therefrom, to the relief of the operator.

I show but two vibrating sieves or screens below the breaker-bed. There may be any number desired, and they may be arranged as in a winnowing-mill, each to deliver at a separate point, and thus group for fillers, cigarettes, and smoking-tobacco.

The operation of the machine is as follows: The tobacco-leaves, having been stripped, are fed from the hopper into the machine, where, being caught by the breaker-arm, they are drawn down and then between the revolving teeth E' of the breaker-arm E and the fixed teeth F' of the stationary bed F, and the facets of both the revolving and fixed teeth, being presented in their passage the one through the other squarely to each other, act like shearing-blades and cut the leaves with a clean cut, whether in a wet, damp, or dry condition, and as the edges pass each other become self-cleaning, and in practice there is no clogging, each revolution of the breaker-arm clearing the bed. When the leaves are sufficiently disintegrated or cut to pass through the screen-bottom $F^2$ it will take place, being assisted therein by the pressure and rubbing of the arm E as it is driven around the box and drags with it the leaves fed within the same. The scraps fall upon the sieve H, and are cleaned of dirt and smaller particles, which, falling through upon the second sieve, I, are still further cleaned of sand or dirt, which accumulates beneath the machine, while the scrap is delivered at the front and rear of the same.

I am aware that I am not the first to suspend or place at reverse angles one screen or sieve below another, whereby delivery of two or more sizes of seeds, &c., may be made on opposite sides of the machine; but I believe myself to be the first to arrange them in the manner shown and described, the upper sieve hung independent of a shoe, and the lower reverse angle sieve or screen suspended from the upper one, and all oscillated or vibrated by a single pitman-rod and crank at the lower end of a vertical shaft.

Having described the construction and operation of my improved scrapper or granulator, I desire to secure by Letters Patent the following claims:

1. A granulating or scrapping machine for tobacco, composed of the following elements: a receptacle, A, provided with a reversing hopper, B, actuating-crank $C^2$, shafts C and D, gears C' and D', adjustable arm E, with teeth E' and fly-wheel rim $E^2$, wire bed $F^2$, breaker F, with teeth F', sieve-shaker $D^4$, sieve-connecting rod G, sieves H and I, suspended by hangers H' $H^2$ and I' $I^2$, a cross-piece, $A^3$, at the top, supporting the shafts C D, and the whole mounted upon legs $A^2$, substantially as shown, and for the purpose set forth.

2. The actuating machinery of a scrapping or granulating tobacco apparatus, comprising the shafts C and D, provided with bevel-gears C' D', crank $C^2$, and the usual bearings, in combination with the diametrical beater-arm E and its seat $D^2$, the sieve-shaker $D^4$, with its pin or set-screw $D^5$, the breaker-arm E, provided with projecting teeth E', square in section and set square with the arm, the fly-rim $E^2$, cross-piece $A^3$, bed breaker or concave F, teeth F', wire bottom $F^2$, box A, rod G, sieves H and I, and hopper B, substantially as shown, and for the purpose described.

3. The bed breaker or concave F, set transversely to the frame and provided with projecting teeth F', square in section and set square with the same, in combination with the revolving and adjustable breaker-arm E, teeth E', fly $E^2$, shafts C D, crank $C^2$, gears C' D', cross-piece $A^3$, box A, hopper B, and sieves H I, substantially as shown, and for the purpose hereinbefore set forth.

4. In combination with a fixed and coarse wire screen-bottom, $F^2$, to the receptacle A, the suspended screens H and I, adapted by mesh of screens and reverse suspension of same to deliver at opposite ends of the machine, the upper screen, H, being suspended at the front by suspenders $H^2$ from the standards $A^5$, at the rear from H', while sieve or screen I is suspended from sieve H at I' and $I^2$, and are both oscillated or vibrated upon their suspenders by rod G from shaker $D^4$, in combination with the actuating mechanism, as described, with box A and hopper B, substantially as and for the purpose specified.

5. The hopper B of a scrapping or granulating machine, as described, closed upon three sides and bottom, suspended to frame of box A by pivots B', and in combination therewith, whereby, when not in use, the same may be thrown back over the machine, forming a cover and protection thereto, substantially as and for the purpose set forth.

6. The adjustable arm E, with its seat $D^2$, fly-rim $E^2$, and projected teeth E', said seat provided with a set-screw, $D^3$, whereby the same may be raised or lowered upon the shaft D and secured thereto, in combination with the actuating mechanism, receptacle A, screens H I, and bed breaker or concave F of a tobacco granulating or scrap machine, substantially as shown, and for the purpose specified.

7. In a tobacco granulating or scrapping machine, as described, the fly-rim $E^2$, secured to the extremities of the revolving arm E, and, in combination therewith, seat $D^2$, shaft D, wheel D', cross $A^3$, wheel C', shaft C, and crank $C^2$, whereby the motion of the arm E is steadied and the operator relieved from jar, substantially as and for the purpose set forth.

JACOB S. SPANGLER.

Witnesses:
EMMA K. SELTZER,
MARY SELTZER.